United States Patent [19]

Guch, Jr. et al.

[11] 4,270,095

[45] May 26, 1981

[54] CYCLOID-SCANNING LASER PUMPING METHOD AND APPARATUS

[75] Inventors: Steve Guch, Jr., Sepulveda; Gordon L. Lundgren, Agoura, both of Calif.

[73] Assignee: Hughes Aircraft Company, Culver City, Calif.

[21] Appl. No.: 35,680

[22] Filed: May 3, 1979

[51] Int. Cl.³ ............................................. H01S 3/08
[52] U.S. Cl. ............................................. 331/94.5 L
[58] Field of Search ..................... 331/94.5 L, 94.5 K, 331/94.5 P; 350/361

[56] References Cited

U.S. PATENT DOCUMENTS 3,341,657  9/1967  Romano, Jr. et al. ............... 350/361

OTHER PUBLICATIONS

"Dye Lasers With Ultrafast Transverse Flow" by Hecht et al., IEEE Jour. Quant. Elect., vol. QE-8, No. 1, (Jan. '72).

Primary Examiner—William L. Sikes
Assistant Examiner—Leon Scott, Jr.
Attorney, Agent, or Firm—Paul M. Coble; William H. MacAllister

[57] ABSTRACT

A dye laser is disclosed wherein a plastic disk containing laser dye is moved within a cylindrical race relative to a stationary pumping laser beam such that the pumping beam effectively scans the surface of the laser disk along a cycloidal path as the disk rolls along the race surface. The cycloidal illumination pattern on the disk enables a significantly increased amount of laser material to be exposed to the pumping beam.

8 Claims, 12 Drawing Figures

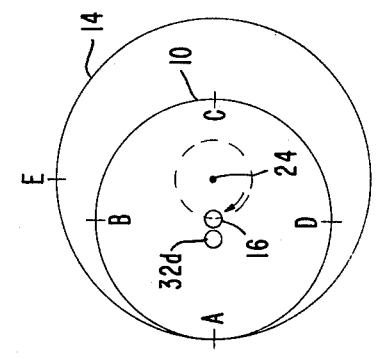
FIG. 2d. FIG. 2h.
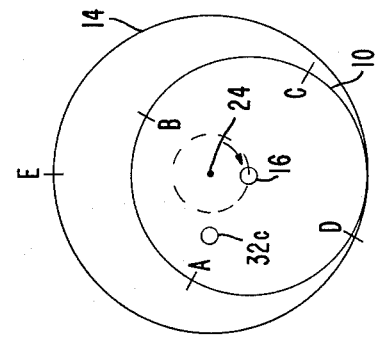
FIG. 2c. FIG. 2g.
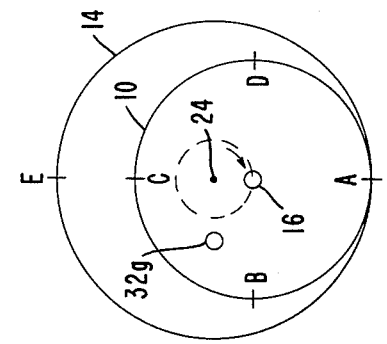
FIG. 2b. FIG. 2f.
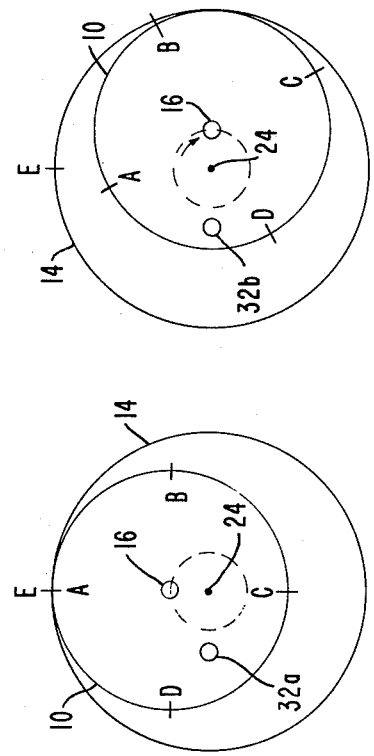
FIG. 2a. FIG. 2e.
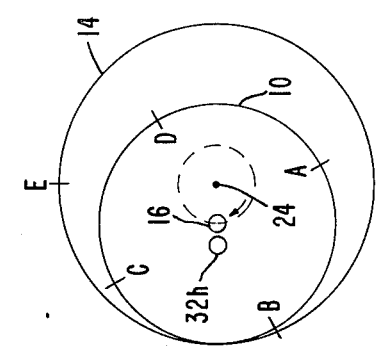
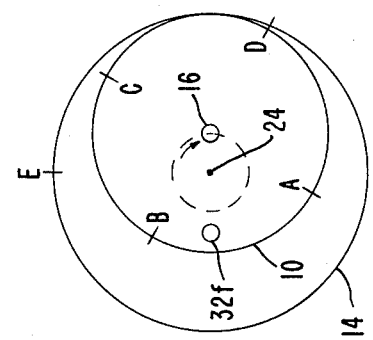
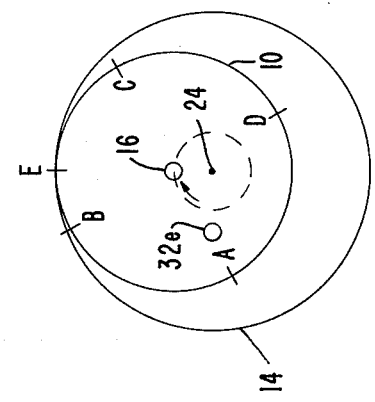

CYCLOID-SCANNING LASER PUMPING METHOD AND APPARATUS

BACKGROUND OF THE INVENTION

1. Field of the Invention

This invention relates to lasers, and more particularly it relates to pumping methods and apparatus for laser-pumped lasers wherein the pumping laser beam is caused to effectively scan the laser medium.

2. Description of the Prior Art Including Prior Art Statement

Certain laser-pumped lasers utilize laser media in which active ions or molecules are embedded in a solid matrix. One example of such a laser is a plastic/dye laser wherein a plastic matrix is impregnated with an organic laser dye. A further example is a Nd:glass laser wherein neodymium ions are embedded in a glass body.

In lasers of the foregoing type, under high average power pumping conditions the laser medium may experience sufficient heating to produce substantial refractive index gradients. In the case of plastic/dye lasers, decomposition of the dye and/or melting of the plastic may occur as well. As a result of these effects, the beam quality (product of the beam divergence and beam diameter) of the generated laser beam, the average power output and the operating life of the laser are significantly limited.

In the prior art, reduced pump flux loading on a laser medium in the form of a dye-bearing plastic disk has been obtained by rotating the disk about an axis passing through the center of the disk and parallel to a stationary pump beam. The pump beam is thus caused to effectively scan an annular region of the disk at a constant radial distance from the center of the disk. Further details concerning the aforementioned rotating disk arrangement may be found in the paper by David L. Hecht et al, "Dye Lasers With Ultrafast Transverse Flow", *IEEE Journal of Quantum Electronics*, Vol. QE-8, No. 1 (Jan. 1972), pp. 15–19.

Although the aforedescribed rotating disk dye laser is able to expose substantially more disk material to the pump beam than with a stationary disk, the annular region of the disk on which the pump beam impinges covers only a small fraction of the disk surface. Therefore, only a small portion of the disk volume is actually utilized, and the beam quality, average power output and operating life of the laser are still limited.

SUMMARY OF THE INVENTION

It is an object of the present invention to provide a method and apparatus for pumping a laser-pumped laser of the type wherein the active laser material is embedded in a solid matrix, and which method and apparatus achieve superior beam quality, higher average power output and longer operating life than the prior art.

It is a further object of the invention to provide a plastic/dye laser in which the life of the dye is increased by at least an order of magnitude.

In the method of the invention, a member containing laser material is exposed to a pumping light beam, and the center of the laser member is moved in a circular orbit about a fixed point in a plane perpendicular to the pumping light beam while the laser member is rotated about its center in the aforementioned plane in a rotational direction opposite to that in which its center is moved such that the pumping light beam impinges upon the laser member along a cycloidal path. The cycloidal path enables a significantly increased amount of laser material to be exposed to the pumping light beam.

In apparatus according to the invention, a disk-shaped member containing the laser material is movably disposed within a cylindrical opening in a race member, and the disk-shaped member is caused to roll along the lateral surface of the opening as it moves in the aforementioned manner to produce a cycloidal pumping beam illumination pattern on the surface of the disk-shaped member.

Additional objects, advantages and characteristic features of the invention will become apparent from the following detailed description of preferred embodiments of the invention when considered in conjunction with the accompanying drawings.

BRIEF DESCRIPTION OF THE DRAWINGS

In the accompanying drawings:

FIGS. 2a through 2h are a series of illustrations showing the eccentrically mounted disk at various sequential positions within the race for the laser of FIG. 1;

DESCRIPTION OF PREFERRED EMBODIMENTS

Figure 1:
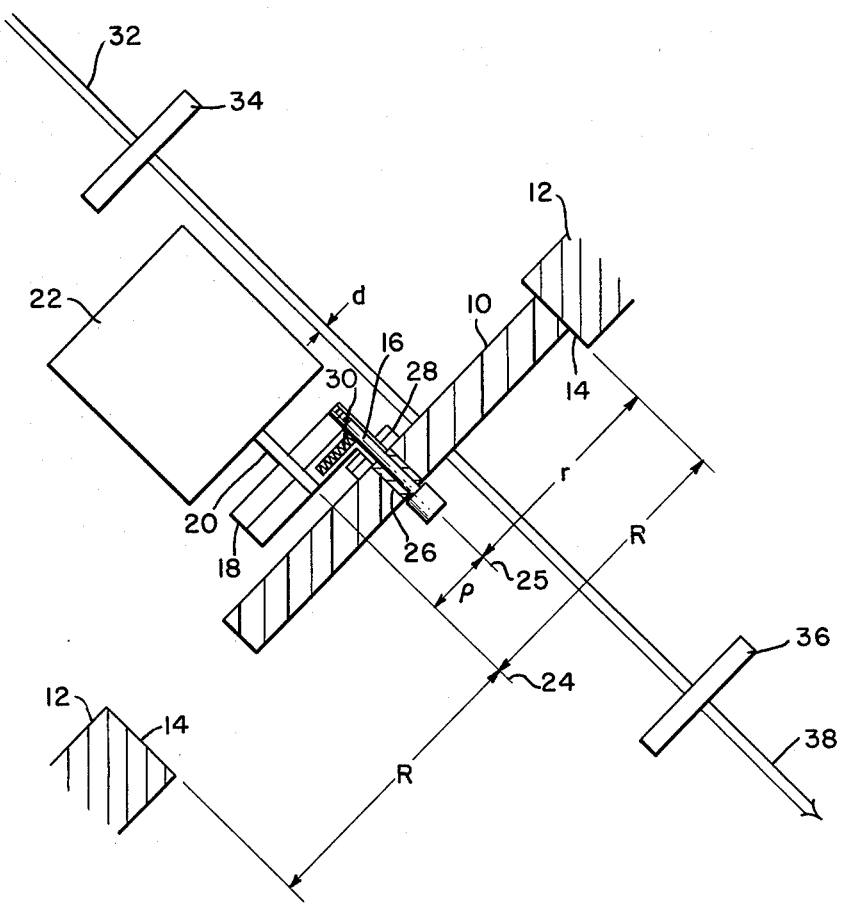
FIG. 1 is a plan view illustrating a laser according to the invention having an active medium-bearing disk eccentrically mounted within a cylindrical race.

Referring to FIG. 1 with greater particularity, a laser according to the invention may be seen to include an active medium-bearing disk 10 of a radius r eccentrically mounted within a cylindrical cavity of a radius R defined by a race member 12. The lateral surface of the disk 10 is urged into contact with and is caused to roll along cylindrical surface 14 of the race member 12 in the manner discribed in detail below.

The disk 10 is coaxially mounted on a crankpin 16 which is carried by a crank arm 18. Crank arm 18, in turn, is mounted on a crankshaft 20 driven by an electric motor 22. The crankshaft 20 is disposed along the axis 24 of cylindrical race surface 14, i.e., is spaced from the surface 14 by the radial distance R. The axis 25 of the disk 10 and crankpin 16 is spaced from the race axis 24 by a distance $\rho$ which indicates the degree of eccentricity of the mounting of the disk 10. A tubular bushing 26 is disposed about the crankpin 16 within an axial hole through the disk 10, while a pair of spacer rings 28 are disposed about the crankpin 16 between the disk 10 and the crank arm 18. The disk 10 is lightly urged against the race surface 14 by means of a loading spring 30 mounted within a radial bore in crank arm 18 and pressing against the crankpin 16.

In a laser according to the invention a stationary input pumping laser beam 32 of a diameter d is caused to impinge upon a broad surface of the disk 10 along a direction parallel to the axis 24. The pump beam 32 is spaced from the axis 24 by a radial distance slightly greater than the radial distance $\rho$ between the axes 24 and 25. An optical resonator for the laser may include a dichroic input mirror 34 disposed in the path of the pump beam 32 at a desired spacing from the input surface of the disk 10 and a broadband reflectance output mirror 36 aligned with the input mirror 34 and disposed at a desired spacing from the opposite surface of the disk 10. If desired, the pump beam 32 may be focussed to a minimum diameter, or waist, portion at its region of incidence upon the disk 10. An output laser beam 38 generated within the medium 10 emerges along the same direction as the direction of propagation of the pump beam 32.

In order to provide a cycloidal scanning pattern which enables a maximum amount of disk surface area to be exposed to the pump beam 32 (8/9 of the disk surface area in theory), the disk radius r should be selected such that $r \simeq \frac{3}{4}R$, and correspondingly, the radial offset $\rho$ between the disk axis 25 and the race axis 24 should be $\rho \simeq \frac{1}{4}R$. Moreover, to reduce or minimize overlap of the pump beam illumination pattern on the surface of the disk 10, the relative values of the radii R, r and $\rho$ should depart slightly from the nominal relative values in the aforementioned approximate relationships, as will be explained in detail below.

In a specific exemplary plastic/dye laser which may be constructed in accordance with the arrangement of FIG. 1, the disk 10 may be of polymethyl-methacrylate plastic and may be doped with Rhodamine B dye (e.g., at a concentration of $2 \times 10^{-4}$ moles per liter) which serves as the active laser medium. Exemplary dimensions for such a disk 10 are a radius r of 3.754 cm and a thickness of 0.64 cm. An appropriate race radius R which may be used in conjunction with a disk radius of 3.754 cm is R=5.000 cm. An exemplary drive speed for the motor 22 is 1 rpm.

When Rhodamine B is used as the laser medium to generate a laser wavelength of 590 nm, the pump beam 32 may have a wavelength of 532 nm (and may be generated by a pulsed frequency-doubled Nd:YAG laser operated at a pulse rate of 20 Hz). An appropriate input mirror 34 for such a laser may be 90% transmissive at 532 nm and 90% reflective at 590 nm, while the output mirror 36 may be 30% reflective at 590 nm, an appropriate separation for the mirrors 34 and 36 being 21 cm. An exemplary beam diameter d for the pump beam 32 at its region of incidence upon the disk 10 may be 0.1 cm. It is pointed out that the aforementioned specific materials and parameter values are set forth solely for illustrative purposes, and other materials and parameter values are also suitable and may be employed instead.

In the operation of the arrangement of FIG. 1, upon rotation of the motor-driven crankshaft 20, the crankpin 16 is caused to revolve about the cavity axis 24 in a circular orbit of radius $\rho$. The disk 10 is thus caused to roll around the race surface 14 without slippage. The resultant motion of the disk 10 relative to the stationary pump beam 32 is such that a cycloidal pattern is traced by the pump beam 32 across the input surface of the disk 10.

The manner in which the aforementioned cycloidal pattern develops is illustrated in more detail in FIGS. 2a-2h which show various sequential positions of the disk 10 within the race 14 for relative radii of $r = \frac{3}{4}R$ and $\rho = \frac{1}{4}R$. FIG. 2a depicts an initial position for the disk 10 within the race 14 wherein point A on the circumferential surface of the disk 10 contacts reference point E on the race 14. In this position the pump beam 32 intersects the disk 10 at region 32a which is located at an intermediate radial position and circumferentially between points C and D on the surface of the disk 10.

When the crankpin 16 has made one-quarter revolution about the race axis 24, the disk 10 is moved to the position shown in FIG. 2b in which a point on the circumferential surface of the disk 10 between points B and C contacts the race 14. In this position the pump beam 32 intersects the disk 10 at region 32b which is located radially near the edge of the disk and circumferentially between points A and D. FIG. 2c illustrates the position of the disk 10 within the race 14 when the crankpin 16 has made one-half revolution about the race axis 24. In this position the pump beam 32 intersects the disk 10 at region 32c which is located at an intermediate radial position and circumferentially near point A on the disk 10. After three-quarters revolution of the crankpin 16 about the race axis 24, the disk 10 assumes the position shown in FIG. 2d. In this position the pump beam 32 intersects the disk 10 at region 32d which is located radially near the center of the disk and circumferentially opposite point A.

After the crankpin 16 has made one complete revolution about the race axis 24, the disk 10 assumes the position within the race 14 illustrated in FIG. 2e. Although in the position of FIG. 2e, the disk 10 contacts the same point E along the race 14 as in the position of FIG. 2a, the various points A, B, C and D along the circumferential surface of the disk 10 are in different positions than in FIG. 2a. Moreover, in the position of FIG. 2e, the pump beam 32 intersects the disk 10 at region 32e which is located at an intermediate radial position and circumferentially near point A on the disk 10.

Respective positions of the disk 10 within the race 14 for further quarter revolutions of the crankpin 16 about the race axis 24 are shown in FIGS. 2f, 2g and 2h, respectively. In these positions the pump beam 32 intersects the disk 10 at respective regions 32f, 32g and 32h on the surface of the disk 10. It should be appreciated from FIG. 2a through FIG. 2h that the disk 10 will regain its initial position (FIG. 2a) within the race 14 when the crankpin 16 has made three complete revolutions about the race axis 24.

Figure 3:
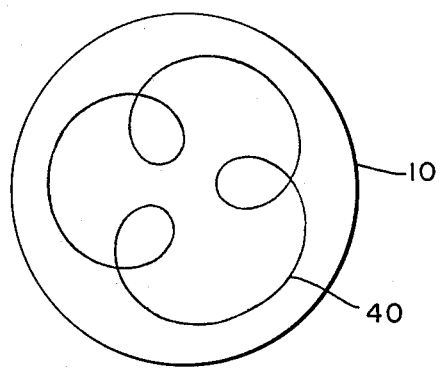
FIG. 3 illustrates an exemplary path traced by the laser beam across the disk in accordance with one embodiment of the invention.

The complete path traced by the pump beam 32 across the surface of the disk 10 during one complete revolution of the disk 10 for the relative radii $r = \frac{3}{4}R$ and $\rho = \frac{1}{4}R$ is shown in FIG. 3. It may be seen from FIG. 3 that as a result of the aforedescribed movement of the disk 10 within the race 14, a cycloidal illumination path 40 is traced by the pump beam 32 across the surface of the disk 10. It should be appreciated that although the pump beam illumination path 40 is shown in the form of a thin line for ease of illustration, in practice the beam illumination path would have a width equal to the diameter d of the beam 32.

Figure 4:
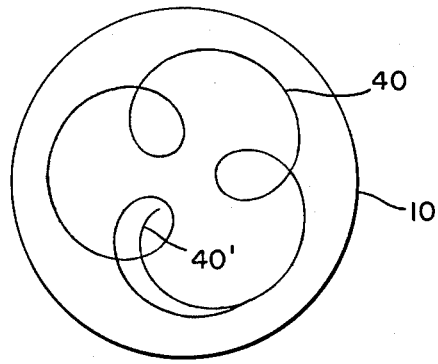
FIG. 4 illustrates an exemplary path traced by the laser beam across the disk during approximately one revolution of the disk in accordance with a further embodiment of the invention.
Figure 5:
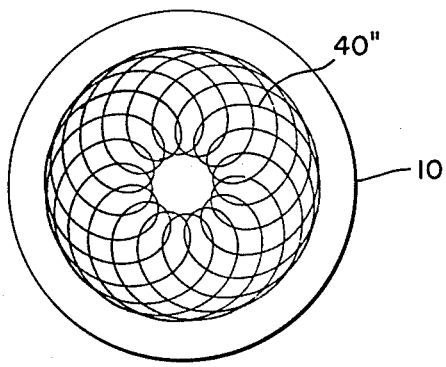
FIG. 5 illustrates a complete disk scanning pattern using the trace partially depicted in FIG. 4.

It should be appreciated from FIG. 3 that the cycloidal beam illumination path 40 is repetitive after each third revolution of the crankpin 16, and a substantial portion of the surface of the disk 10 is never illuminated by the pump beam 32. However, in a preferred embodiment of the present invention, the radii of the disk 10 and the race 14 are made to differ slightly from the relationship $r = \frac{3}{4}R$ in order to maximize, or at least significantly increase, the portion of the surface of the disk 10 scanned by the pump beam 32. Thus, as shown in FIG. 4, after approximately one revolution of the disk 10, the beam illumination path 40 is caused to be slightly modified, as shown at 40', so that the original beam illumination path across the surface of the disk 10 is not retraced until at least a large number of disk revolutions have occurred. An exemplary complete disk scanning pattern utilizing such a modified path 40" is illustrated in FIG. 5.

In designing a cycloid-scanning laser pumping arrangement according to the aforementioned preferred embodiment of the invention, nominal values for the disk radius r and the race radius R first may be selected in accordance with the aforementioned relationship $r = \frac{3}{4}R$, and then exact relative values may be determined for r and R such that after a number of revolutions of the crankpin 16 corresponding to one revolution of the disk 10, the angular position of the disk 10 will be offset from its original position by an amount equal to the diameter d of the pump beam 32 at the circumference of the disk 10.

More specifically, for each revolution of the crankpin 16 about the race axis 24, the disk 10 will rotate through an angle of $2\pi R/r$ (in radians) relative to the point of contact between the disk 10 and the race 14. After N revolutions of the crankpin 16, the aforementioned relative rotation angle will be $2\pi N(R/r)$, and when this angle is an integral multiple of $2\pi$, the disk 10 will regain its initial position within the race 14. Since when $r = \frac{3}{4}R$ the disk 10 first returns to its initial position after three revolutions of the crankpin 16, N=3 is the appropriate value to consider, and for this value of N there will be four revolutions of the disk 10 relative to the disk-race contact point. It is desired that after four such relative revolutions the disk 10 will be offset from its original position by an amount equal to the diameter d of the pump beam 32 at the circumference of the disk (i.e., by $d/2\pi r$). Thus, exact relative values for the radii r and R may be selected according to the relationship:

$$2\pi(3)R/r = 2\pi(4 - (d/2\pi r)). \tag{1}$$

Solving Equation (1) for the disk radius r gives:

$$r = (\tfrac{3}{4}R) + (d/8\pi). \tag{2}$$

It should be appreciated that when relative values for the radii r and R are selected in accordance with Equation (2), the quotient R/r is irrational (i.e., is not expressible as a ratio of integers); hence, in principal, the pump beam 32 never retraces the identical path across the surface of the disk 10. However, in practice, since the pump beam 32 has a finite diameter, after a sufficient number of revolutions of the disk 10, portions of the beam illumination path eventually will be retraced.

As may be seen from FIG. 5, a cycloidal scanning pattern provided by the present invention enables most of the surface area of the disk 10 to be exposed to the pump beam 32. In contrast, with simple disk rotating arrangements of the prior art, only a very small fraction of the disk surface area (a ring of radial extent equal to the pump beam diameter) is utilized. In fact, for disk and pump beam diameters typically encountered (e.g., those having the exemplary values given above), the present invention increases the amount of disk material utilized by more than an order of magnitude over the prior art. This not only enables the laser beam quality to be improved, but it also enables the average power output and the operating life of the laser to be increased accordingly.

Although the present invention has been shown and described with reference to particular embodiments, nevertheless various changes and modifications which are obvious to a person skilled in the art to which the invention pertains are deemed to lie within the spirit, scope and contemplation of the invention.

What is claimed is:

1. A method for pumping a laser comprising:
   exposing a disk having laser material distributed substantially throughout said disk to a pumping light beam of a wavelength capable of exciting said laser material to a condition of population inversion; and
   moving the center of said disk in a circular orbit about a fixed point in a plane perpendicular to said pumping light beam while rotating said disk about its center in said plane in a rotational direction opposite to that in which its center is moved such that said pumping light beam impinges upon said disk along a cycloidal path.

2. A method for pumping a laser comprising:
   exposing a disk having laser material distributed substantially throughout said disk to a pumping light beam of a wavelength capable of exciting said laser material to a condition of population inversion, and
   moving the axis of said disk in a circular orbit about a fixed axis through said disk parallel to said pumping light beam while rotating said disk about its axis in a rotational direction opposite to that in which its axis is moved such that said pumping light beam impinges upon said disk along a cycloidal path.

3. A method for pumping a laser comprising:
   locating a disk having laser material distributed substantially throughout said disk within a cylindrical opening of a diameter greater than that of said disk such that the respective axes of said opening and said disk are parallel to one another and such that a portion of the peripheral surface of said disk contacts a portion of the lateral surface of said opening;
   introducing a pumping light beam of a wavelength capable of exciting said laser material to a condition of population inversion into said opening at a location radially outwardly of the axis of said disk relative to the axis of said opening and along a direction of parallel to said axes; and
   moving the axis of said disk in a circular orbit about the axis of said opening while causing said disk to roll along the lateral surface of said opening to produce movement of said disk within said opening such that said pumping light beam impinges upon said disk along a cycloidal path.

4. A laser pumping arrangement comprising:
   a race member defining a cylindrical opening therethrough about a first axis;
   a disk having laser material distributed substantially throughout said disk and having a diameter less than that of said cylindrical opening movably disposed within said opening about a second axis parallel to and spaced from said first axis such that a portion of the peripheral surface of said disk contacts a portion of the surface of said opening;
   means for introducing a pumping light beam of a wavelength capable of exciting said laser material to a condition of population inversion into said opening at a location radially outwardly of said second axis relative to said first axis and along a direction parallel to said axes; and
   means for moving said second axis in a circular orbit about said first axis while causing said disk to roll along the lateral surface of said opening to produce movement of said disk within said opening such that said pumping light beam impinges upon said disk along a cycloidal path.

5. A laser pumping arrangement according to claim 4 wherein said cylindrical opening has a radius R and said disk has a radius r approximately but not exactly equal to $\frac{3}{4}$R.

6. A laser pumping arrangement comprising:
a race member defining a cylindrical opening therethrough about a predetermined axis;
crank means including a crankshaft disposed along said axis, a crank member extending radially outwardly from said crankshaft, and a crankpin carried by said crank member at a predetermined radial distance from said axis and extending into said opening along a direction parallel to said axis;
a disk having laser material distributed substantially throughout said disk disposed within said opening and coaxially rotatably mounted on said crankpin, said disk having a radius equal to the distance from the axis of said crankpin to the lateral surface of said opening;
means for introducing a pumping light beam of a wavelength capable of exciting said laser material to a condition of population inversion into said opening at a radial location outwardly of said crankpin and along a direction parallel to said predetermined axis; and
means for rotating said crankshaft, whereby said crankpin revolves about said predetermined axis, causing said disk to roll along the lateral surface of said opening and move within said opening such that said pumping light beam impinges upon said disk along a cycloidal path.

7. An arrangement according to claim 6 and further including spring means carried by said crank member for urging the peripheral surface of said disk into contact with the lateral surface of said opening.

8. A laser pumping arrangement according to claim 5 wherein the radius r of said disk is given by $r = \frac{3}{4}R + (d/8\pi)$, where d is the diameter of said pumping light beam.

* * * * *